United States Patent [19]

Stahel

[11] Patent Number: 4,596,422
[45] Date of Patent: Jun. 24, 1986

[54] MOTORCYCLE DRIVER BACKREST BAR

[75] Inventor: Alwin J. Stahel, St. Paul, Minn.

[73] Assignee: Drag Specialties, Inc., Minnetonka, Minn.

[21] Appl. No.: 648,582

[22] Filed: Sep. 10, 1984

[51] Int. Cl.$^4$ ............................................. A47C 1/25
[52] U.S. Cl. .................................. 297/378; 403/117; 297/DIG. 9; 297/396
[58] Field of Search ......... 297/378, 354, 379, DIG. 9, 297/331, 335, 53, 54; 248/425; 403/117; 16/273, 374, 376

[56] References Cited

U.S. PATENT DOCUMENTS

| 128,191 | 6/1872 | Wachob | 403/117 |
|---|---|---|---|
| 459,702 | 9/1891 | Forsberg | 16/374 |
| 562,901 | 6/1896 | Lambert | 297/335 X |
| 875,251 | 12/1907 | Field | 403/117 |
| 1,423,513 | 7/1922 | Brown | 16/374 |
| 2,312,638 | 3/1943 | Gedris | 16/374 X |
| 3,612,606 | 10/1971 | Swenson | 297/396 X |
| 3,734,548 | 5/1973 | Kieves | 403/383 X |
| 4,025,210 | 5/1977 | Johnson | 403/383 X |
| 4,313,639 | 2/1982 | Ware | 297/DIG. 9 |

FOREIGN PATENT DOCUMENTS

| 36480 | 9/1981 | Fed. Rep. of Germany | 16/273 |
|---|---|---|---|
| 2515583 | 5/1983 | France | 297/353 |

OTHER PUBLICATIONS

Drag Specialties, Inc. New Product and Information Catalog, vol. 1, No. 5, May/Jun. 1983, p. 45.

Primary Examiner—William E. Lyddane
Assistant Examiner—Peter A. Aschenbrenner
Attorney, Agent, or Firm—Faegre & Benson

[57] ABSTRACT

Apparatus is disclosed for pivotally connecting the ends of a backrest support to both sides of a seat on a motorcycle. A bracket with one or more apertures is mounted on the sides of the seat. A pivot disk with a projecting hub on one side which is substantially the same size and shape as the bracket aperture is unrotatably engaged with the bracket to hold the pivot disk in place. The backrest support is rotatably fastened to the opposite side of the pivot disk, where a plurality of projections on the pivot disk limit the rotation of the backrest support.

8 Claims, 3 Drawing Figures

MOTORCYCLE DRIVER BACKREST BAR

BACKGROUND OF THE INVENTION

1. Field of the Invention

The present invention relates to backrest support structures for the driver of a motorcycle.

2. Description of the Prior Art

On long-distance motorcycle rides, the comfort of the driver is an important concern. Backrests have been used for support of the driver's back and shoulders to reduce fatigue and discomfort. It is also important that the backrest be pivotable to a forward position so that a passenger can mount and dismount the vehicle easily.

Present designs utilize support structures in which the rearward movement of the support bar, when the driver leans against the backrest, is stopped when a portion of the support bar comes into contact with a mechanical stop. This arrangement presents a dangerous situation in that clothing, fingers, etc., can easily be caught between the bar and the mechanical stop and crushed by the large amount of force exerted when the driver reclines against the backrest.

SUMMARY OF THE INVENTION

The present invention is an apparatus which allows a motorcycle driver's backrest to be pivotally attached to the driver's seat. A bracket with one or more apertures is mounted on the side of the driver's seat. A pivot disk with a projection which is substantially the same size and shape as the bracket aperture is unrotatably engaged with the bracket to hold the pivot disk in place. A support means for the backrest is rotatably fastened to the pivot disk by use of a fastening means. A plurality of projections on the pivot disk allow the support means to rotate over an arc of approximately 90° or from an essentially vertical position to an essentially horizontal position. A cap may be used to conceal the end of the support means and the pivot disk. The cap eliminates the danger of getting objects or fingers pinched or crushed in the apparatus.

DETAILED DESCRIPTION OF THE PREFERRED EMBODIMENT

Figure 1:
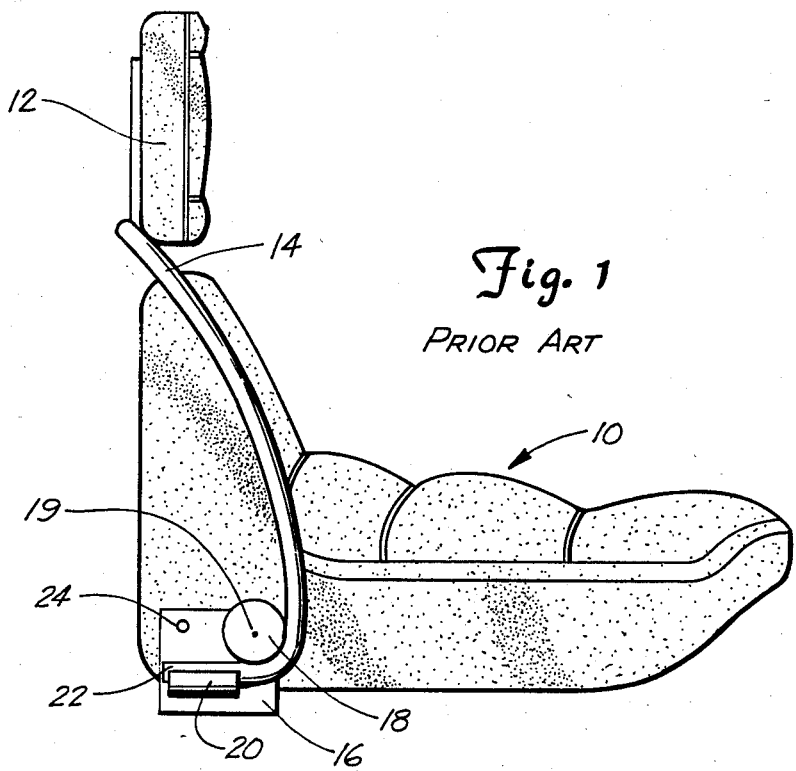
FIG. 1 shows a prior art design of a driver backrest bar.

FIG. 1 is a side view of a prior art design for a motorcycle driver backrest bar showing the apparatus mounted on a side of a motorcycle seat 10. A backrest 12 is positioned above the seat 10 by support bar 14. Support brackets 16 are mounted on either side of the seat 10. Support bar 14 is attached to disk 18 which is rotatable about a pivot point 19. Mechanical stop 20 halts the downward rotation of end portion 22 of support bar 14. One or more adjusting holes 24 are provided in the support brackets 16 to allow remounting of bracket 16 to effect the forward or rearward adjustment of the pivot point 19 of the backrest assembly with respect to the bracket 16 and the seat 10.

Figure 3:
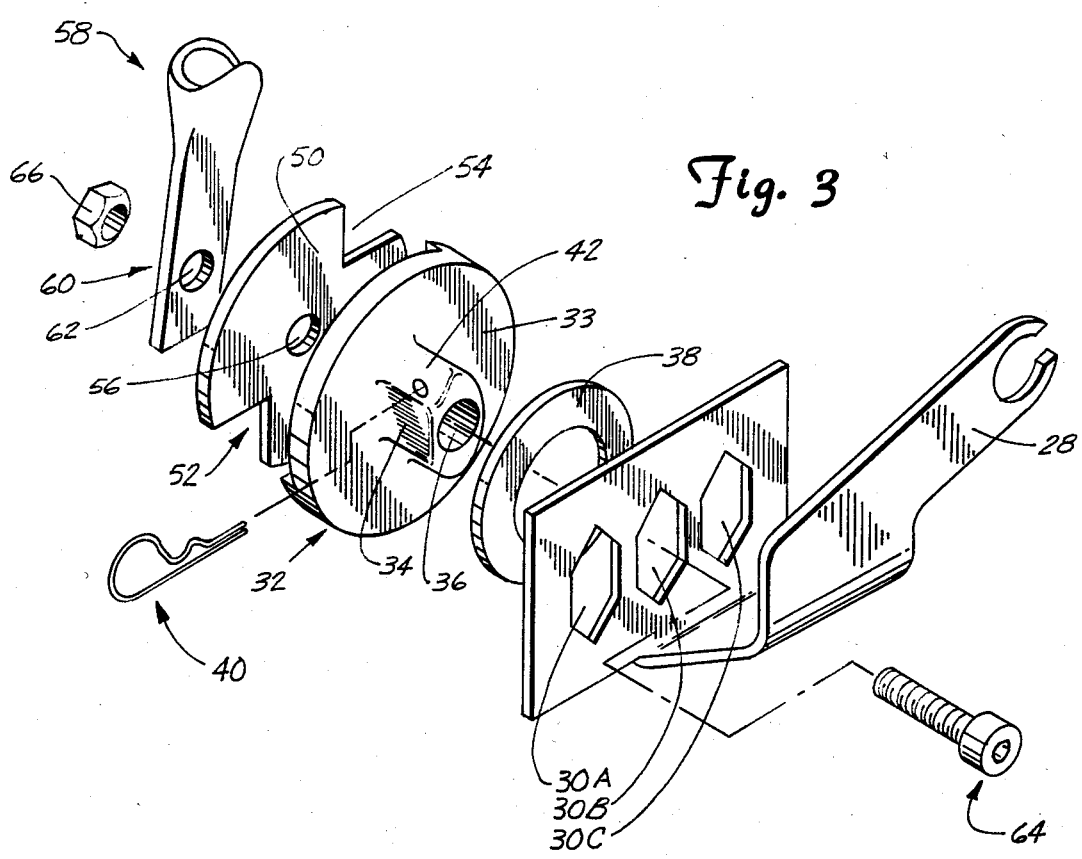
FIG. 3 shows an exploded view of the present invention.
Figure 2:
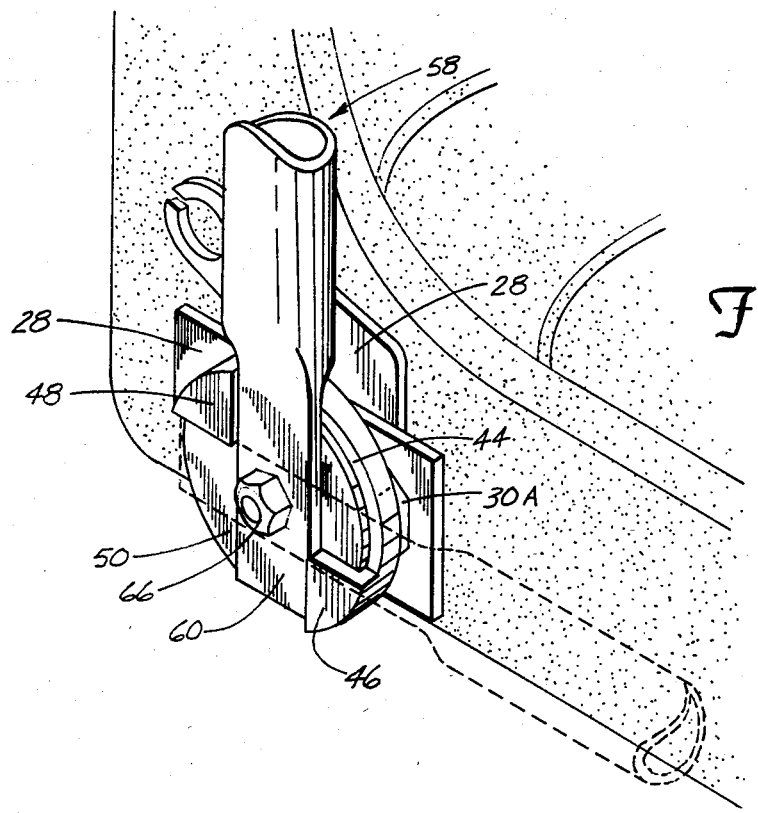
FIG. 2 shows an assembled view of the present invention.

A preferred embodiment of the present invention for a motorcycle driver's backrest is shown in FIGS. 2 and 3. A mounting bracket 28 is fastened to both sides of seat 10 and each includes identical apertures 30A, 30B and 30C. These apertures are non-circular in cross section and allow the locked position of the backrest pivot point to be incrementally adjusted forward or rearward with respect to the seat to optimize driver comfort.

The face of a pivot disk 32 has a first, generally axial, projection or hub 34 extending perpendicularly from it. Projection 34 has a height and shape keyed to engage the apertures 30A through 30C of mounting bracket 28 to define several locking positions. It includes an axial orifice 36 which extends through both projection 34 and pivot disk 32. A spacer ring 38 with an inside diameter larger than the cross-section of projection 34 is placed over the projection 34 and rests against the first surface 33 of pivot disk 32. Projection 34 is then inserted into a selected one of the apertures 30A through 30C. A retaining means, such as a spring clip or cotter pin 40, extends through a hole 42 which extends through the wall of hub 34 to lockingly keep hub 34 inserted into aperture 30.

The reverse side 44 of pivot disk 32 contains second and third lobes 46 and 48 which protrude perpendicularly from its surface. A wear plate 50 has first and second notches 52 and 54 which interfit with lobes or stops 46 and 48, respectively, and an axial center hole 56. In the preferred embodiment shown, wear plate 50 is constructed of a material such as nylon or teflon for self-lubrication.

A backrest support bar 58 is used to support the driver's backrest (not shown). An end portion 60 of the support bar 58, which may be flattened, includes a hole 62. A fastener, such as mounting bolt 64 and nut 66, extends through orifice 36 of the hub 34, hole 56 of wear plate 50 and hole 62 of the end portion 60 of support bar 58. The fastener 64 holds pivot disk 32, wear plate 50 and support bar 58 in position so that the support bar 58 can rotate against wear plate 50.

Rotation of the support bar 58 is stopped in either of two positions by lobes 46 or 48 to define the position of the seat for normal riding and the folded seat position for mounting and dismounting. These two positions are shown by the solid and broken lines of FIG. 2.

The support bar can rotate from a substantially horizontal position, which allows a rider to mount the motorcycle with ease, to a substantially vertical position, which supports the driver's while riding. This defines an arc of approximately 90 degrees.

If desired, a protective cap (not shown) may be used to conceal the end 60 of the support bar 58, pivot disk 32, wear plate 50, mounting bolt 64 and nut 66. Such a cap, in addition to having an ornamental effect by concealing the backrest adjustment hardware, prevents injury from pinching between end portion 60 of support bar 58 and lobes 46 or 48.

I claim:

1. Apparatus for pivotally connecting the ends of a backrest support to both sides of a seat of a motorcycle, comprising:

bracket means having at least one aperture having a polygonal cross section, the bracket means constructed and arranged for mounting at the sides of the seat;

pivot disk means having a projecting axial hub on one side thereof which is constructed and arranged for locking insertion into the aperture of the bracket means and which has a hole projecting therethrough, the other side surface having at least two lobes projecting therefrom; and fastening means extending through the pivot disk means and holes bored in the backrest support for connecting the support to the pivot disk means and permitting limited rotation thereof relative to the bracket means between positions defined by the lobes.

2. The apparatus of claim 1 wherein the bracket means has a plurality of polygonal cross section apertures, each of which is positioned at varying locations on the bracket means for receiving the projecting axial hub of the pivot disk means in locking engagement therewith, thereby permitting selection of the location of the pivot point for the backrest support at various points relative to the seat.

3. The apparatus of claim 1 wherein the fastening means comprises a bolt and a nut.

4. The apparatus of claim 1 further comprising:
wear plate means having an axial opening in an annular ring portion through which the axial hub of the pivot disk means projects, the annular ring portion mounted between the pivot disk means and the backrest support for providing a bearing surface for facilitating pivotal movement of the backrest support between the positions defined by the lobes.

5. The apparatus of claim 5 wherein the wear plate means is constructed from a self-lubricating material.

6. The apparatus of claim 1 further comprising:
retaining means for retaining the hub within a bracket aperture.

7. The apparatus of claim 6 wherein the retaining means comprises a spring clip constructed and arranged for insertion through a hole in the hub to restrain the hub from removal from the aperture.

8. The apparatus of claim 1 wherein the lobes are constructed and arranged for allowing the backrest support to rotate through an arc of approximately 90-degrees.

* * * * *